United States Patent

Chao

[11] Patent Number: 6,056,457
[45] Date of Patent: May 2, 2000

[54] KEYBOARD IN WHICH METAL PLATES OF VARYING THICKNESS MAY BE INSTALLED

[75] Inventor: Shih-Hung Chao, Pan-Chiao, Taiwan

[73] Assignee: Acer Peripherals Inc., Taoyuan, Taiwan

[21] Appl. No.: 09/222,289

[22] Filed: Dec. 28, 1998

[30] Foreign Application Priority Data

Jun. 26, 1998 [TW] Taiwan .................................. 87110340

[51] Int. Cl.⁷ ....................................................... B41J 5/16
[52] U.S. Cl. ........................................... 400/472; 400/490
[58] Field of Search ..................................... 400/472, 490, 400/491.3, 492, 480, 481; 361/680

[56] References Cited

U.S. PATENT DOCUMENTS

| | | | |
|---|---|---|---|
| 4,560,845 | 12/1985 | Takamura et al. ........................... | 200/5 |
| 5,001,307 | 3/1991 | Blaser ..................................... | 400/472 |
| 5,535,091 | 7/1996 | Lee ......................................... | 361/680 |
| 5,810,491 | 9/1998 | Muller et al. ............................. | 400/472 |
| 5,879,088 | 3/1999 | English .................................... | 400/481 |

FOREIGN PATENT DOCUMENTS 0226520  8/1985  Germany ................................ 400/472

*Primary Examiner*—John S. Hilten
*Assistant Examiner*—Anthony H. Nguyen
*Attorney, Agent, or Firm*—Winston Hsu

[57] ABSTRACT

The present invention provides a keyboard comprising a cover plate, a base plate, a metal support, and a thin layer membrane. The cover plate comprises a plurality of supporting structures with a plurality of key caps installed on top and is movable in an up-down vertical direction. The thin layer membrane installed below the cover plate comprises a plurality of switches with each switch underlying a key cap for detecting the operation of the plurality of key caps. The metal support installed under the thin layer membrane strengthens the structure of the keyboard. The base plate is installed under the metal support and comprises a plurality of protruding columns of varying heights to accommodate different metal supports of varying thickness. By supporting the metal support of a specific thickness, the protruding columns of corresponding height help to maintain the thin layer membrane at the specified height between the cover plate and the base plate.

4 Claims, 5 Drawing Sheets

6,056,457

KEYBOARD IN WHICH METAL PLATES OF VARYING THICKNESS MAY BE INSTALLED

BACKGROUND OF THE INVENTION

1. Field of the Invention

The invention relates to a keyboard, and more particularly, to a keyboard in which metal plates of varying thickness may be installed.

2. Description of the Prior Art

A typical keyboard comprises a cover chassis, a base chassis, a plurality of keys installed on the cover chassis in a vertically moveable manner, and a flexible circuit board installed between the cover chassis and the base chassis for detecting operations of the keys. Some keyboards further comprise metal plates to strengthen the structure of the keyboards.

A keyboard without a metal plate is often comparatively thinner. It does not contain a space for installation of a metal plate and therefore, when a client requests a keyboard with such a metal plate, the manufacturer must build an entirely new thicker keyboard that can accommodate the metal plate. On the other hand, a keyboard with a metal plate is thick. If the metal plate is requested to be removed, the manufacturer must produce another base chassis to fill the void previously occupied by the metal plate. In addition, if a client requires a metal plate of a different thickness than that normally provided, yet another base chassis design is needed. For keyboards of the same type, electronic components in the keyboards have to be maintained at a predetermined level regardless of whether metal plates are installed or what the thickness of the keyboard is, thus the manufacturer has to produce various base chassis to comply with demands of various clients which not only increases the cost of molds, but also increases the types of components and the cost of managing various components.

SUMMARY OF THE INVENTION

It is therefore a primary objective of the present invention to provide a keyboard which can be installed with metal plates with various thickness to solve the aforementioned problem.

Briefly, in a preferred embodiment, the present invention provides a keyboard comprising:

- a cover chassis comprising a plurality of supporting structures and a plurality of key caps of which the bottom sides are connected to the supporting structures;
- a base chassis installed below the cover chassis comprising a plurality of protruding columns;
- a metal plate installed between the cover and the base chassis for strengthening the structure of the keyboard;
- a flexible circuit board installed between the cover chassis and the metal plate comprising a plurality of switches positioned below each of the key caps of the cover chassis for detecting pressures exerted on the key caps, the metal plate for maintaining the flexible circuit board at a predetermined level between the cover and the base chassis;
- wherein the protruding columns have one or more predetermined heights and the protruding columns of a specific height being used for supporting the metal plate of a corresponding thickness so as to enable the metal plate to maintain the flexible circuit board at the predetermined level between the cover chassis and the base chassis.

It is an advantage of the present invention that a plurality of protruding columns of varying heights enable installation of a metal plate with a unique thickness into the keyboard according to the request of the client to strengthen the structure of the keyboard. This leads to increased flexibility in the use of keyboard components.

These and other objects and the advantages of the present invention will no doubt become obvious to those of ordinary skill in the art after having read the following detailed description of the preferred embodiment that is illustrated in the various figures and drawings.

DETAILED DESCRIPTION OF THE PREFERRED EMBODIMENT

Figure 1:
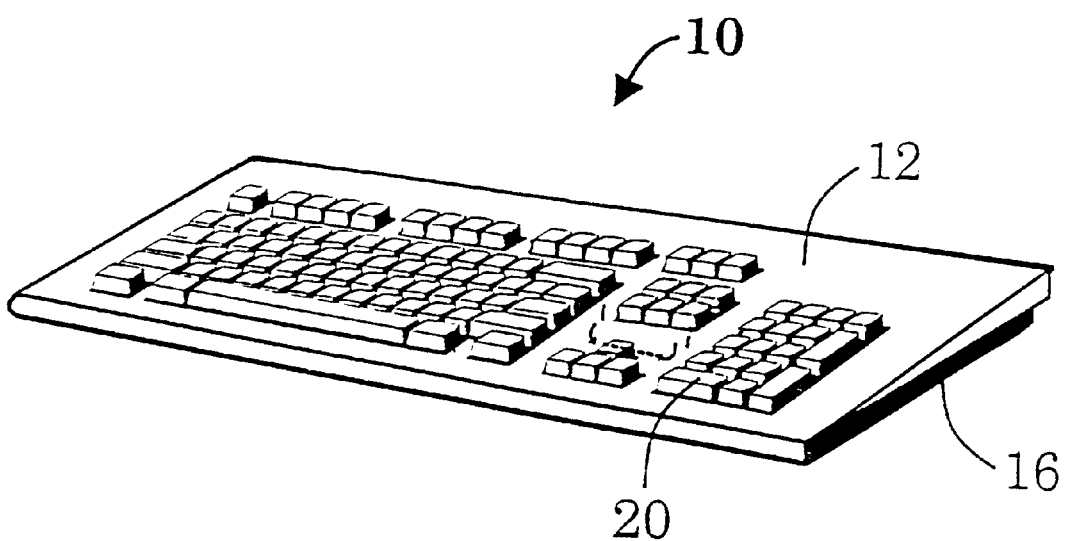
FIG. 1 is a perspective view of a keyboard according to the present invention.
Figure 2:
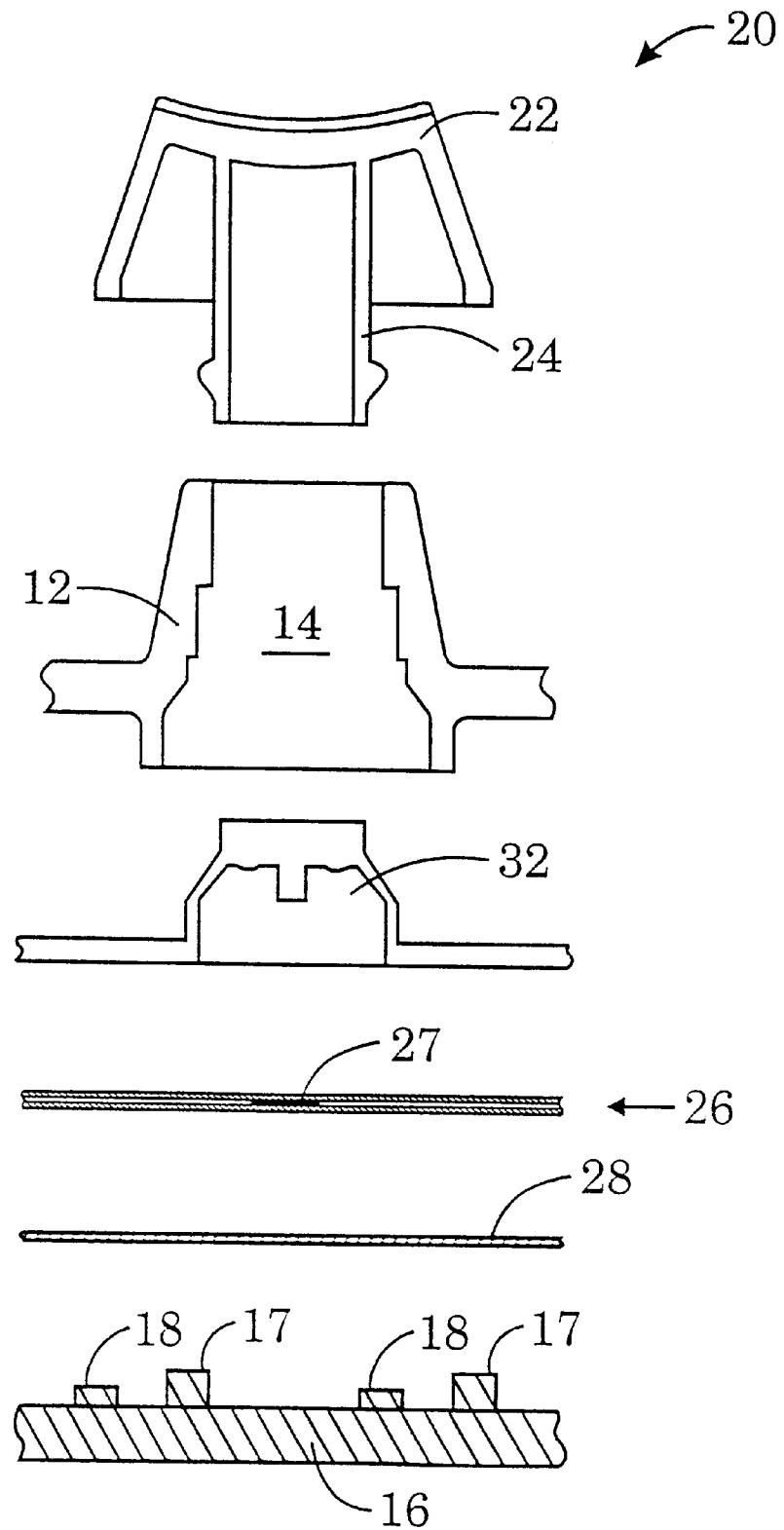
FIG. 2 is a component diagram of the keyboard in FIG. 1.
Figure 3:
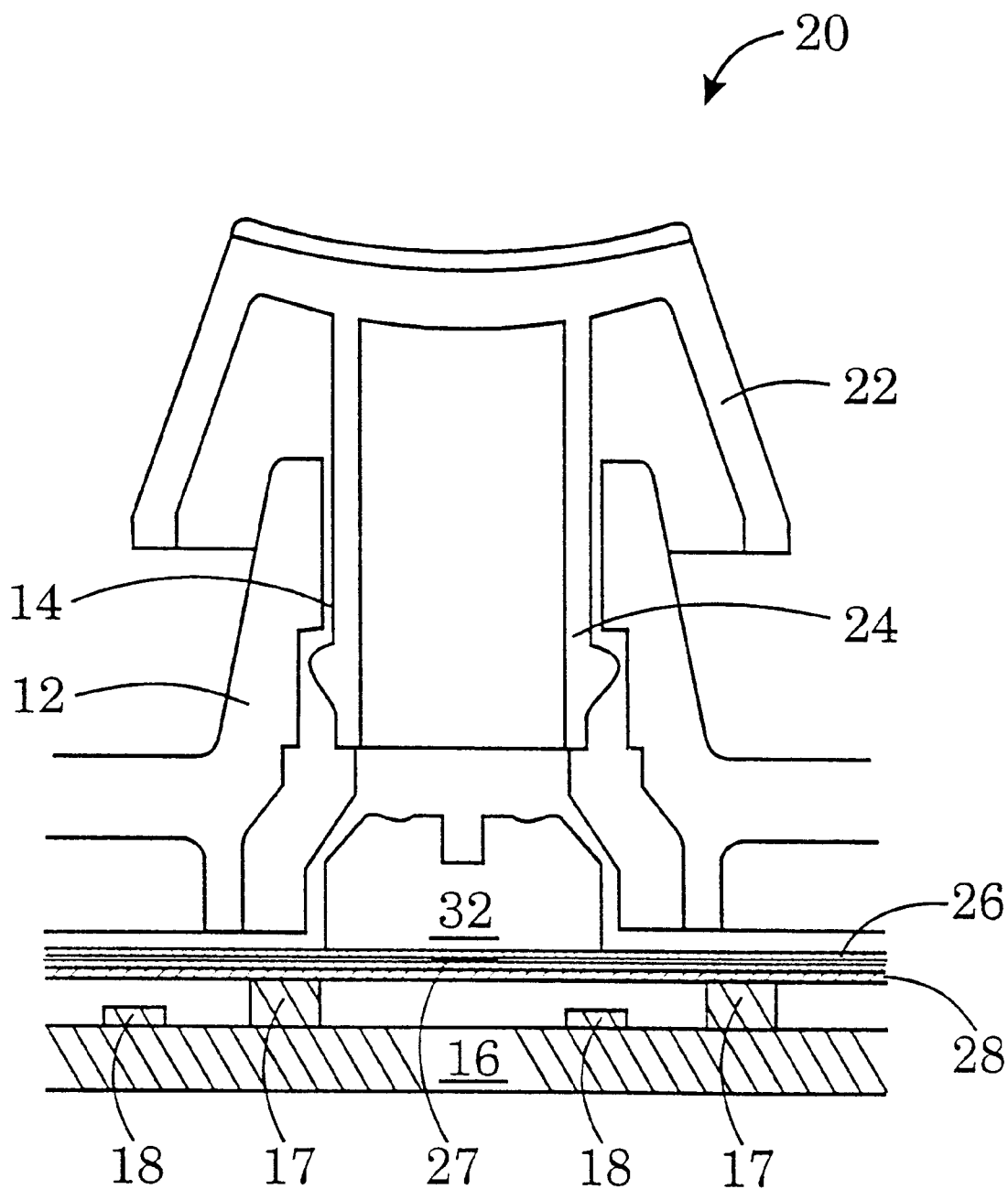
FIG. 3 is a sectional view along line 1—1 of the keyboard in FIG. 1.

Please refer to FIGS. 1 to 3. FIG. 1 is a perspective view of a keyboard 10 according to the present invention. FIG. 2 is a component diagram of the keyboard 10 in FIG. 1. FIG. 3 is a sectional view along line 1—1 of the keyboard 10. The keyboard 10 comprises a cover chassis 12 comprising a plurality of supporting structures which can be vertical housings 14, a base chassis 16 installed below the cover chassis 12 on which is installed a plurality of protruding columns 17, 18, a plurality of keys 20 installed inside each of the vertical housings 14, a metal plate 28 installed between the cover chassis 12 and the base chassis 16 for strengthening the structure of the keyboard 10, and a flexible circuit board 26 installed between the cover chassis 12 and the metal plate 28 for detecting operations of the keys 20. Each of the keys 20 comprises a protruding rod 24 vertically installed inside a vertical housing 14 in a slidable manner, a key cap 22 installed on top of the protruding rod 24, and a rubber piece 32 installed below the protruding rod 24 on the flexible circuit board 26. The flexible circuit board 26 comprises a plurality of switches 27 installed on it below each of the vertical housings 14 of the cover chassis 12 for detecting the operations of the keys 20. When the key cap 22 of a key 20 is depressed, the protruding rod 24 below the key cap 22 will be pressed onto the rubber piece 32 so that the switch 27 below the key 20 will be triggered between the rubber piece 32 of the key 20 and the metal plate switch and will generate a corresponding detected signal, and then the rubber piece 32 will bounce back to the original position before the switch 27 was triggered.

The plurality of protruding columns 17 and 18 on the base chassis 16 have different heights with columns 17 being taller than columns 18. They are separately used to support metal plates of different thickness so as to maintain the flexible circuit board 26 at a predetermined level between the cover chassis 12 and the base chassis 16.

Figure 4:
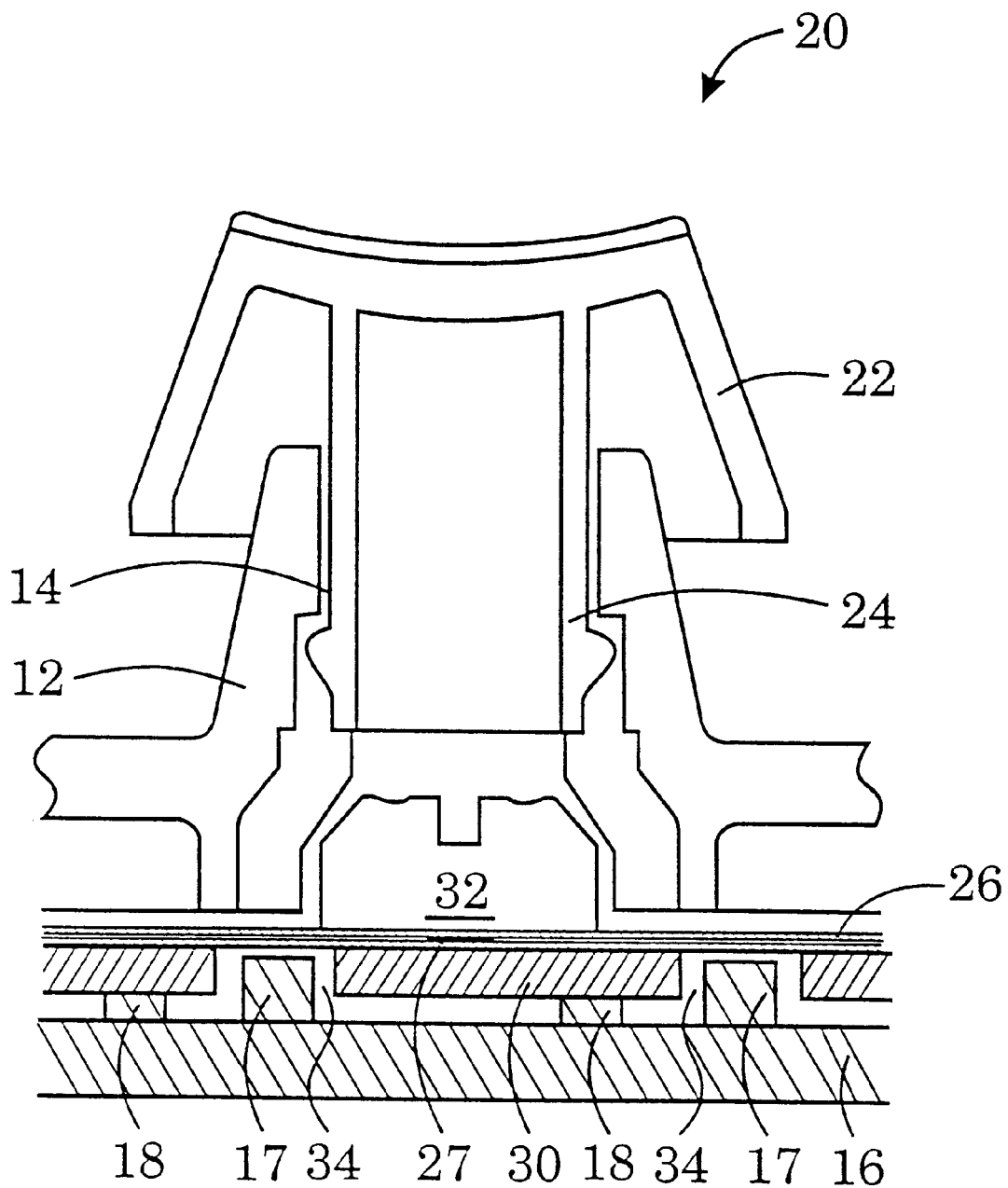
FIG. 4 is a sectional view along line 1—1 of an alternative embodiment of the keyboard in FIG. 1.

Please compare FIGS. 3 and 4. FIG. 4 is a sectional view along line 1—1 of an alternative embodiment of the keyboard 10. The critical difference between the keyboard structures of FIGS. 3 and 4 is the thickness of the metal plates 28 and 30. The metal plate 28 is thinner with its bottom aspect in direct contact with the protruding columns 17. The metal plate 30 is thicker and has a plurality of openings 34 corresponding to positions of the columns 17 so that the columns 17 can protrude into the openings 34, and the bottom of the metal plate 30 can be in contact with the columns 18. Because the thinner metal plates 28 are supported by the taller protruded columns 17, and the thicker metal plates 30 are supported by the shorter protruded columns 18, the flexible circuit board 26 can be maintained at a predetermined level above the base chassis 16 regardless of which metal plate 28 or 30 supports it thus preventing malfunctioning of the keys 20.

In addition to the metal plates 28 and 30, the base chassis 16 of the keyboard 10 can also support another thick metal plate. The metal plate has openings at positions corresponding to positions of the columns 17 and 18 so that the columns 17 and 18 can penetrate the metal plate causing the metal plate to come into direct contact with the base chassis 16 and thereby becoming supported by the base chassis 16.

Columns 17 and 18 maintain the flexible circuit board 26 at a predetermined level above the base chassis 16 and must match the thickness of the metal plates. Installation of additional columns of differing heights will permit the installation of metal plates of different thickness.

Figure 5:
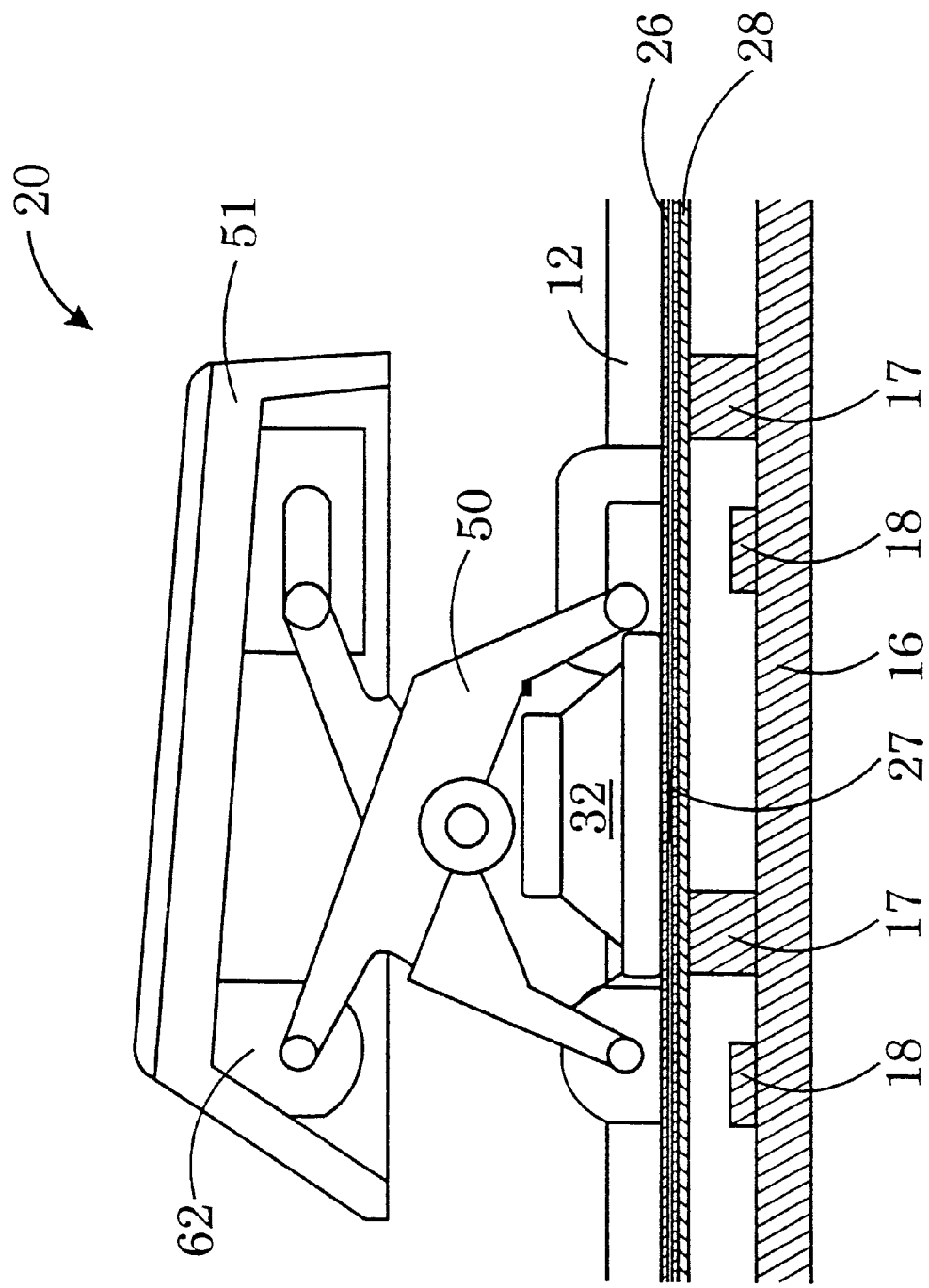
FIG. 5 is another embodiment using scissors-shaped supporting structures according to the present invention.

The keyboard of the present invention may be installed with other supporting structures. Please refer to FIG. 5. FIG. 5 is another embodiment using scissors-shaped supporting structures according to the present invention. The cover chassis 12 comprises a scissors-shaped supporting structure 50 installed in an up-and-down moveable manner. The key cap 51 is installed on the scissors-shaped supporting structure 50 thereby enabling vertical movement of the key 20 on the cover chassis 12. When the key cap 51 of the key 20 is depressed, the switch 27 below the key 20 will be triggered between the rubber piece 32 of the key 20 and the metal plate 28 so as to generate a corresponding detected signal, and then the rubber piece 32 will bounce back to the position before the switch 27 was triggered.

Compared with the prior art keyboard, the base chassis 16 of the keyboard 10 comprises a plurality of protruding columns 17 and 18 with different heights for installing a metal plate 28 or 30 with unique thickness to strengthen the structure of the keyboard 10. In this way, the metal plates 28 or 30 may be installed in accordance with the client's request thereby increasing flexibility of the use of keyboard components.

Those skilled in the art will readily observe that numerous modifications and alterations of the propeller may be made while retaining the teachings of the invention. Accordingly, the above disclosure should be construed as limited only by the metes and bounds of the appended claims.

What is claimed is:

1. A keyboard comprising:

a cover chassis comprising a plurality of supporting structures and a plurality of key caps of which the bottom sides are connected to the supporting structures;

a base chassis installed below the cover chassis comprising a plurality of protruding columns;

a metal plate installed between the cover and the base chassis for strengthening the structure of the keyboard;

a flexible circuit board installed between the cover chassis and the metal plate comprising a plurality of switches positioned below each of the key caps of the cover chassis for detecting pressures exerted on the key caps, the metal plate for maintaining the flexible circuit board at a predetermined level between the cover and base chassis;

wherein the protruding columns have one or more predetermined heights and the protruding columns of a specific height being used for supporting the metal plate of a corresponding thickness so as to enable the metal plate to maintain the flexible circuit board at the predetermined level between the cover and the base chassis.

2. The keyboard of claim 1 wherein the metal plate contains a plurality of openings or recesses for allowing protruding columns taller than the specific height to stick into the openings or recesses so that the protruding columns of the specific height can directly touch and support the metal plate.

3. The keyboard of claim 1 wherein the supporting structures are vertical housings installed on the cover chassis, and each of the key caps contains a protruding rod on its lower end slidably mounted in one of the housings.

4. The keyboard of claim 1 wherein the supporting structures are scissors-shaped supporting structures movably installed on the cover chassis, each of the key caps comprises a plurality of hooks on its lower end for fastening the scissors-shaped supporting structures.

* * * * *